(12) United States Patent
Srinivasan et al.

(10) Patent No.: US 8,051,085 B1
(45) Date of Patent: Nov. 1, 2011

(54) DETERMINING REGULAR EXPRESSION MATCH LENGTHS

(75) Inventors: Maheshwaran Srinivasan, Sunnyvale, CA (US); Alexey Starovoytov, Los Gatos, CA (US)

(73) Assignee: NetLogic Microsystems, Inc., Santa Clara, CA (US)

( * ) Notice: Subject to any disclaimer, the term of this patent is extended or adjusted under 35 U.S.C. 154(b) by 319 days.

(21) Appl. No.: 12/505,372

(22) Filed: Jul. 17, 2009

Related U.S. Application Data

(60) Provisional application No. 61/082,051, filed on Jul. 18, 2008.

(51) Int. Cl.
*G06F 7/00* (2006.01)
(52) U.S. Cl. ......... 707/737; 707/758; 711/101; 711/103
(58) Field of Classification Search .................. 707/737, 707/758; 711/101, 103
See application file for complete search history.

(56) References Cited

U.S. PATENT DOCUMENTS

| | | | |
|---|---|---|---|
| 5,995,963 A | 11/1999 | Nanba et al. | |
| 6,067,574 A | 5/2000 | Tzeng | |
| 6,980,992 B1 | 12/2005 | Hursey et al. | |
| 7,058,821 B1 | 6/2006 | Parekh et al. | |
| 7,139,753 B2 | 11/2006 | Bass et al. | |
| 7,139,837 B1 | 11/2006 | Parekh et al. | |
| 7,225,188 B1 | 5/2007 | Gai et al. | |
| 7,353,332 B2 | 4/2008 | Vladan | 711/108 |
| 7,440,304 B1 | 10/2008 | Raj | |
| 7,529,746 B2 | 5/2009 | Ichiriu et al. | 707/5 |
| 7,539,031 B2 | 5/2009 | Ninan et al. | 365/49.1 |
| 7,539,032 B2 | 5/2009 | Ichiriu et al. | 365/49.1 |
| 7,610,269 B1 | 10/2009 | Gupta | 707/2 |
| 7,624,105 B2 | 11/2009 | Ichiriu et al. | 707/4 |
| 7,643,353 B1 | 1/2010 | Srinivasan et al. | 365/49.17 |
| 7,644,080 B2 | 1/2010 | Mammen et al. | 707/6 |
| 7,656,716 B1 | 2/2010 | Srinivasan et al. | 365/49.17 |

(Continued)

OTHER PUBLICATIONS

"Efficient String Matching: An Aid to Bibliographic Search," Aho, A. V. and Corasick, M. J., Communications of the Association of Computing Machinery (ACM) Jun. 1975, vol. 18, No. 6. pp. 333-340.

(Continued)

*Primary Examiner* — Etienne Leroux
*Assistant Examiner* — Cindy Nguyen
(74) *Attorney, Agent, or Firm* — Mahamedi Paradice Kreisman LLP; William L. Paradice, III

(57) ABSTRACT

A method and apparatus are disclosed for determining the lengths of one or more substrings of an input string that matches a regular expression (regex) The input string is searched for the regex using an non-deterministic finite automaton (NFA), and upon detecting a match state a selected portion of the input string is marked as a match string. The NFA is inverted to create a reverse NFA that embodies the inverse of the regex. For some embodiments, the reverse NFA is created by inverting the NFA such that the match state of the NFA becomes the initial state of the reverse NFA, the initial state of the NFA becomes the match state of the reverse NFA, and the goto transitions of the NFA are inverted to form corresponding goto transitions in the reverse NFA. The match string is reversed and searched for the inverted regex using the reverse NFA, and a counter is incremented for each character processed during the reverse search operation. The current value of the counter each time the match state in the reverse NFA is reached indicates the character length of a corresponding substring that matches the regex.

13 Claims, 7 Drawing Sheets

U.S. PATENT DOCUMENTS

| | | | |
|---|---|---|---|
| 7,660,140 B1 | 2/2010 | Joshi et al. | 365/49.17 |
| 7,831,606 B2 * | 11/2010 | Pandya | 707/758 |
| 7,872,890 B1 | 1/2011 | Starovoytov | 365/49.17 |
| 7,876,590 B2 | 1/2011 | Joshi | |
| 7,916,510 B1 | 3/2011 | Starovoitov et al. | 365/49.1 |
| 2004/0162826 A1 | 8/2004 | Wyschogrod et al. | |
| 2005/0050260 A1 | 3/2005 | Schacham et al. | |
| 2008/0212581 A1 | 9/2008 | Miller et al. | 370/389 |
| 2010/0054013 A1 | 3/2010 | Joshi et al. | 365/49.17 |

OTHER PUBLICATIONS

"Over 10Gbps String Matching Mechanism for Multi-stream Packet Scanning Systems," Yutaka Sugawara, Mary Inaba, and Kei Hiraki, FPL 2004, LNCS 3203, pp. 484-493, 2004, J. Becker, M. Platzner, S. Vernalde, Editors.

"Memory Organization Scheme for the Implementation of Routing Tables in High Performance IP Routers", document dated Nov. 21, 2003, 6 pages.

Alicherry et al., "High Speed Pattern Matching for Network IDS/IPS," IEEE, pp. 187-196 (2006).

McAuley e al., "Fast Routing Table Lookup Using CAMs," IEEE, p. 1382 (1993).

Yu et al., "Gigabit Rate Packet pattern-Matching Using TCAM," Proceedings of the Network Protocols, 12th IEEE Int Conf on (ICNP'04), pp. 174-183 (2004).

* cited by examiner

DETERMINING REGULAR EXPRESSION MATCH LENGTHS

CROSS-REFERENCE TO RELATED APPLICATION

This application claims the benefit under 35 USC 119(e) of the commonly owned U.S. Provisional Application No. 61/082,051 entitled "Determining Regular Expression Match Lengths" filed on Jul. 18, 2008, which is incorporated herein by reference.

TECHNICAL FIELD

This disclosure relates generally to string searching and more specifically determining the length of matching strings in regular expression search operations.

BACKGROUND OF RELATED ART

Packet classification is employed by Internet routers to implement a number of advanced Internet services such as policy-based routing, rate-limiting, access control in firewalls, service differentiation, traffic shaping, and traffic billing. Each of these services requires the router to classify incoming packets into different classes and then to perform appropriate actions depending upon the packet's specified class. For example, in packet routing applications, an incoming packet is classified to determine whether to forward or filter the packet, where to forward the packet to, what class of service the packet should receive, and/or how much should be charged for transmitting the packet. A packet classifier embodies a set of policies or rules that define what actions are to be taken based upon the contents of one or more fields of the packet's header. The packet header, which typically includes source and destination addresses, source and destination port numbers, protocol information, and so on, can match more than one rule. For example, one rule in a firewall application can specify either a "permit" or "deny" action for a given set of source and destination addresses, another rule in the firewall application can specify either a "permit" or "deny" action for a given protocol, and yet another rule in the firewall application can specify either a "permit" or "deny" action for a particular source address and protocol.

In addition, security is increasingly becoming a critical issue in enterprise and service-provider networks as usage of public networks such as the Internet increases. Many organizations continue to rely upon firewalls as their central gatekeepers to prevent unauthorized users from entering their networks. However, organizations are increasingly looking to additional security measures to counter risk and vulnerability that firewalls alone cannot address. Intrusion Detection Systems (IDSs) analyze data in real time to detect, log, and stop misuse or attacks as they occur. More specifically, network-based IDSs analyze packet data streams within a network searching for unauthorized activity, such as attacks by hackers. In many cases, IDSs can respond to security breaches before systems are compromised. When unauthorized activity is detected, the IDS typically sends alarms to a management console with details of the activity and can often order other systems, such as routers, to cut off the unauthorized sessions.

The parsing of data packets for an IDS is typically performed in software by a dedicated module or library executed by a processor. These modules or libraries may be written in any number of well-known programming languages. The Perl programming language is often selected because of its highly developed pattern matching capabilities. In Perl, the patterns that are being searched for are generally referred to as regular expressions. A regular expression can simply be a word, a phrase or a string of characters. More complex regular expressions include metacharacters that provide certain rules for performing the match. The period ("."), which is similar to a wildcard, is a common metacharacter. It matches exactly one character, regardless of what the character is. Another metacharacter is the plus sign ("+") which indicates that the character immediately to its left may be repeated one or more times. If the data being searched conforms to the rules of a particular regular expression, then the regular expression is said to match that string. For example, the regular expression "gauss" would match data containing gauss, gaussian, degauss, etc.

To search an input string for a regular expression, the regular expression is typically converted into a search tree such as a non-deterministic finite automaton (NFA) that includes a number of states interconnected by goto or "success" transitions. Then, to search the input string for the regular expression, a state machine starts at an initial state of the NFA and transitions states of the NFA according to its goto transitions. If in a given state the input character matches the goto transition, the goto transition is taken to the next state in the string path and a cursor is incremented to point to the next character in the input string. If the input character does not match the goto transitions at any given state, which results in edge failure, a failure transition may be taken.

For example, FIG. 1 shows an NFA 100 that embodies the regular expression R1="ab([a-f][a-d])+def." The NFA 100 includes an initial state or root node S0, intermediate states S1-S6, and a match state S7. The sequence of states S0-S7 are connected by goto transitions representing character matches with an input string, as indicated in FIG. 1. For example, if an input character "a" is received at the initial state S0, the state machine transitions to S1 along the "a" goto transition, and the cursor is incremented to the next input character in the input string. If the next input character is a "b," the state machine transitions from S1 to S2 along the "b" goto transition. Then, if the next input character belongs to the character class [a-f], the state machine transitions from S2 to S3 along the "[a-f]" goto transition. Conversely, if at S1 the next input character is anything other than a "b," or if at S2 the next input character is not 'a,' 'b,' 'c,' 'd,' 'e,' or 'f,' then the state machine returns to the initial state S0, which typically remains active for the NFA, as indicated by the arrow 101.

The regular expression R1="ab([a-f][a-d])+def" is a complex regular expression for which multiple portions of the corresponding NFA 100 can be active at the same time. For example, upon a character class match with [a-d] at state S3, the state machine transitions to both states S2 and S4, and therefore states S2 and S4 are simultaneously active. For example, Table 1 depicts a search operation between an input string IN1="abbababccdefg" and R1 according to the NFA 100 of FIG. 1.

TABLE 1

| Cycle | Input Character | Active States | Action |
| --- | --- | --- | --- |
| 1 | a | 1 | |
| 2 | b | 2 | |
| 3 | b | 3 | |
| 4 | a | 1, 2, 4 | |
| 5 | b | 2, 3 | |
| 6 | a | 1, 2, 3, 4 | |
| 7 | b | 2, 3, 4 | |
| 8 | c | 2, 3, 4 | |

TABLE 1-continued

| Cycle | Input Character | Active States | Action |
|---|---|---|---|
| 9 | c | 2, 3, 4 | |
| 10 | d | 2, 3, 4, 5 | |
| 11 | e | 3, 6 | |
| 12 | f | 7 | match |
| 13 | g | none | |

As shown in Table 1, in response to the first three input characters "abb," the state machine transitions from the initial state S0 to state S3 along goto transitions "a," "b," and "[a-f]," respectively. The fourth input character 'a' of IN1 matches "[a-d]" and causes the state machine to transition from state S3 to both states S2 and S4 at the same time. Further, because 'a' is the first character of R1, the state machine also transitions to state S1 (not shown in FIG. 1 for simplicity). Thus, in the fourth cycle, states S1, S2, and S4 are simultaneously active in NFA 100. The next input character 'b' causes the state machine to simultaneously transition from S1 to S2 and from S2 to S3. The search operation proceeds as depicted in Table 1 until the match state S7 is reached upon a match with the input character 'f' in the twelfth cycle. The state machine reaches the match or accept state S7, which indicates a match condition between the input string and the regular expression. Thereafter, the last input character 'g' does not match the goto transition from S1, and thus does not result in an additional match. Note that although not indicated in Table 1 for simplicity, the initial state S0 remains active during search operations so that a match sequence can be initiated at any point in the input string.

To determine the length of the portion of the input string that matches the regular expression, the number of state transitions taken between the initial and match states of the NFA during the string search operation are typically counted. However, for complex regular expressions such as R1 in which multiple states of the corresponding NFA can be active at the same time, the number of state transitions between the initial and match states of the NFA does not provide the lengths of any overlapping or nested substrings that also match the regular expression, and therefore may also complicate identification of such substrings. Further, use of the NFA search operation to calculate the lengths of all matching substrings may require a separate counter for each potentially matching substring, which is impractical.

BRIEF DESCRIPTION OF THE DRAWINGS

The present embodiments are illustrated by way of example and are not intended to be limited by the figures of the accompanying drawings, where.

Like reference numerals refer to corresponding parts throughout the drawing figures.

DETAILED DESCRIPTION

Figure 1:
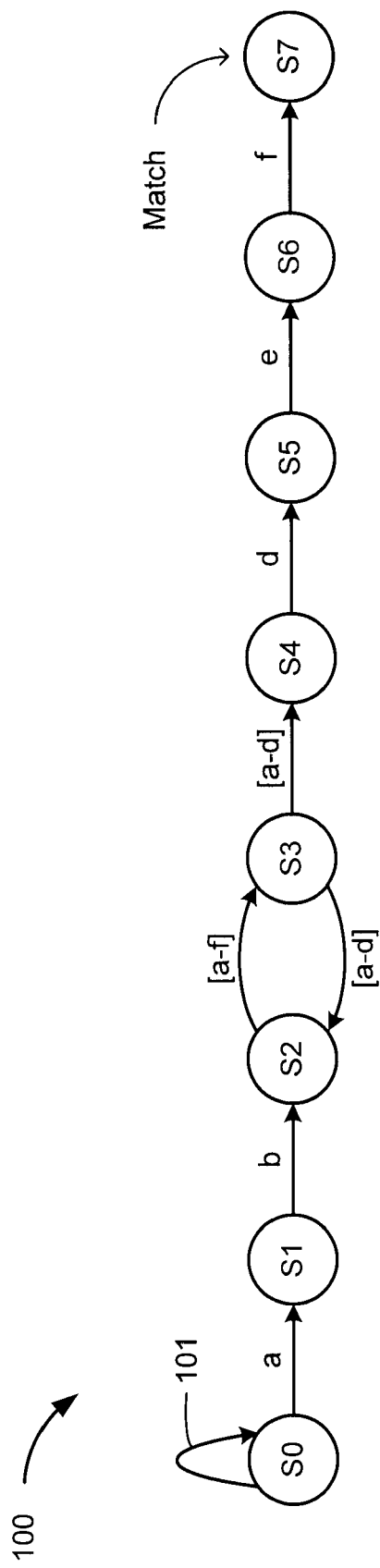
FIG. 1 illustrates a non-deterministic finite automaton (NFA) representative of an exemplary regular expression R1.

In the following description, numerous specific details are set forth such as examples of specific components, circuits, and processes to provide a thorough understanding of the present invention. In the following description, for purposes of explanation, specific nomenclature is set forth to provide a thorough understanding of the present invention. However, it will be apparent to one skilled in the art that these specific details may not be required to practice present embodiments. In other instances, well-known circuits and devices are shown in block diagram form to avoid obscuring the present embodiments unnecessarily. It should be noted that the steps and operation discussed herein (e.g., the loading of registers) can be performed either synchronously or asynchronously. The term "coupled" as used herein means connected directly to or connected through one or more intervening components or circuits. Any of the signals provided over various buses described herein may be time multiplexed with other signals and provided over one or more common buses. Additionally, the interconnection between circuit elements or blocks may be shown as buses or as single signal lines. Each of the buses may alternatively be a single signal line, and each of the single signal lines may alternatively be buses. Further, the prefix symbol "/" or the suffix "B" attached to signal names indicates that the signal is an active low signal. Each of the active low signals may be changed to active high signals as generally known in the art.

A method and apparatus are disclosed for determining the lengths of one or more substrings of an input string of characters that matches a regular expression (regex) using a single counter. More specifically, for some embodiments, the input string is first searched for the regular expression using a search tree such as a non-deterministic finite automaton (NFA) that embodies the regular expression. If there is a match, a selected portion of the input string is marked and/or stored in a suitable memory device as a match string. The NFA is inverted to create a reverse search tree such as a reverse NFA (RNFA) that embodies an inverted regular expression. For some embodiments, the reverse NFA is created by inverting the NFA such that the match state of the NFA becomes the initial state of the reverse NFA, the initial state of the NFA becomes the match state of the reverse NFA, and the goto transitions of the NFA are inverted to form corresponding goto transitions in the reverse NFA. The match string is then compared with the inverted regular expression using the reverse NFA. For each substring within the match string that matches the inverted regular expression, a character length of the matching substring is determined as a function of the number of state transitions of the reverse NFA to reach the match state of the reverse NFA. This process continues until the entire reverse match string is processed in the reverse NFA. In this manner, the character lengths of each of a plurality of overlapping and/or nested matching substrings can be determined in a single reverse search operation using a single counter.

Figure 2:
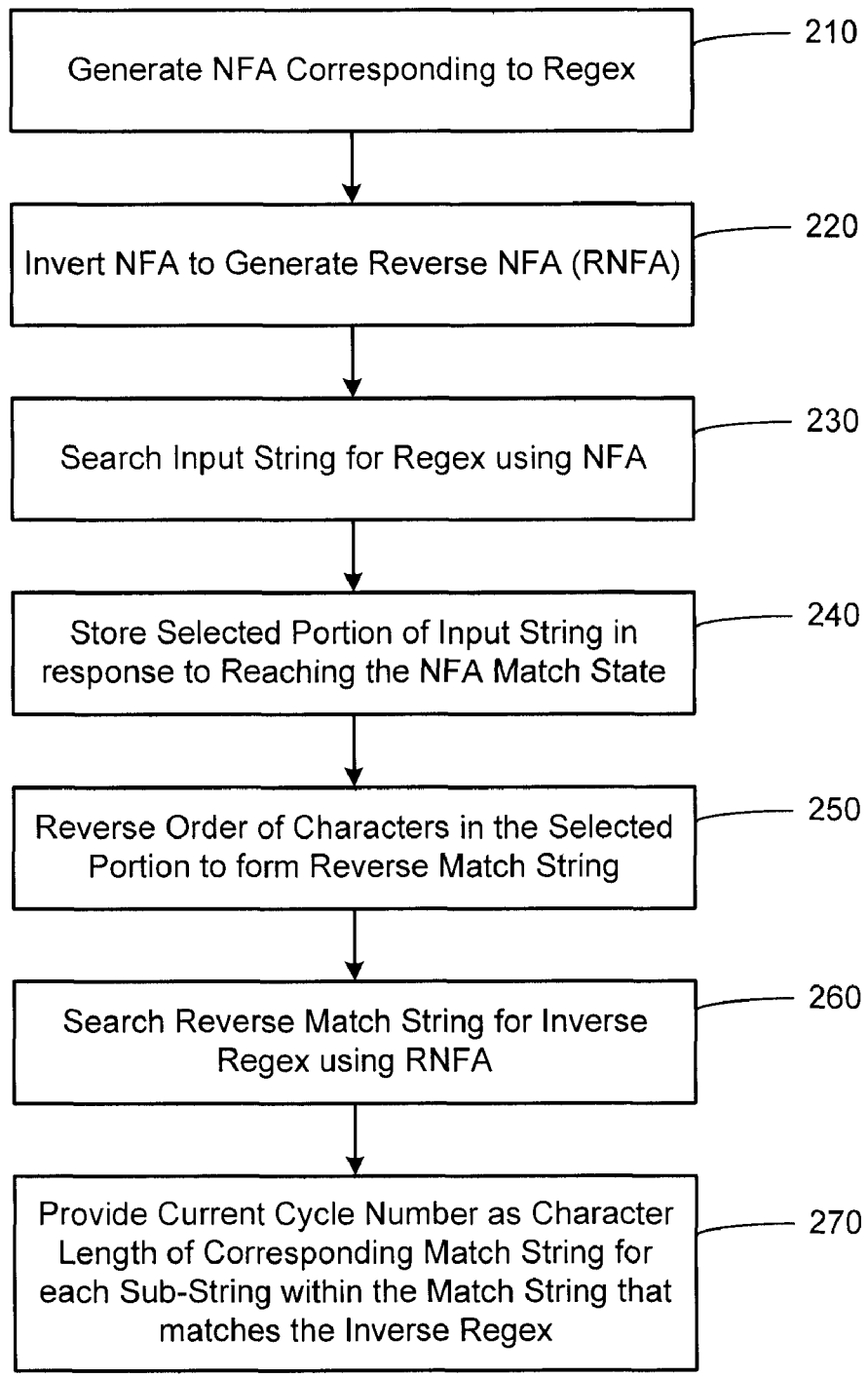
FIG. 2 illustrates a flow chart depicting an exemplary operation to determine the character lengths of one or more substrings within an input string that match a regular expression.

FIG. 2 illustrates a flow chart depicting an exemplary operation to determine the character lengths of one or more substrings within an input string that matches a regular expression. At 210, a search tree such as a non-deterministic finite automaton (NFA) embodying the regular expression is first created. For example, the NFA shown in FIG. 1 may be used to implement the regex R1="ab([a-f][a-d])+def". As will be described in greater detail below, the NFA may be implemented in either software (e.g., using a CPU or multipurpose processor) and/or hardwired logic (e.g., using an ASIC or preconfigured logic gates).

At 220, the NFA is inverted to create a corresponding reverse non-deterministic finite automaton (RNFA). The RNFA, which embodies an inverted regular expression, is used to perform a reverse search operation of the input string to isolate one or more substrings within the input string that individually match the regular expression. As will be described in greater detail below, the reverse search operation (also referred to herein as a "substring search operation") allows any and/or all matching substrings to be determined concurrently with their character lengths. Accordingly, when creating the reverse NFA, the match state of the NFA becomes the initial state or root node of the RNFA, the initial state of the NFA becomes the match state of the RNFA, and the goto (i.e., success) transitions are reversed.

Figure 3:
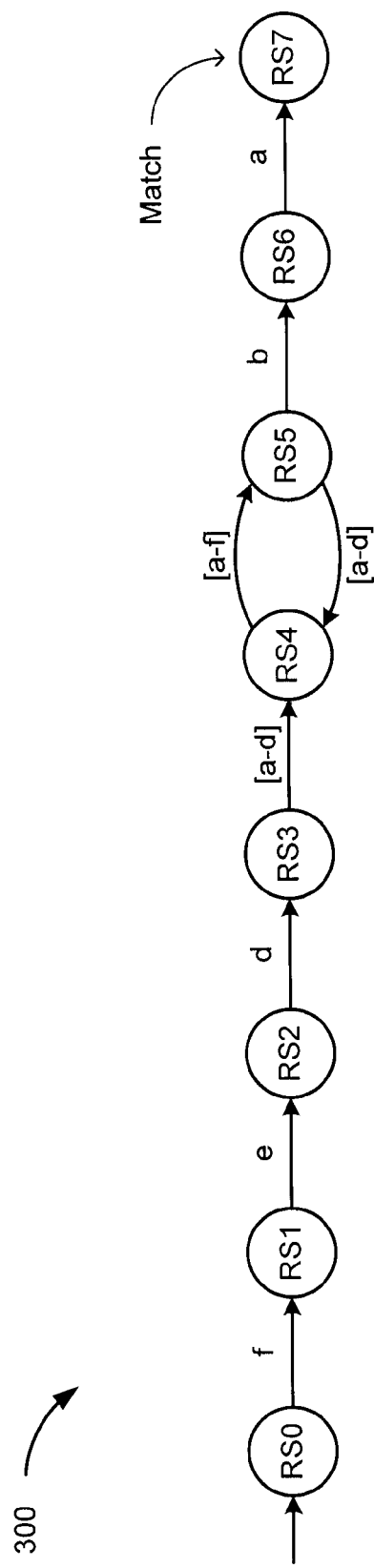
FIG. 3 illustrates a reverse non-deterministic finite automaton (RNFA) created from the NFA of FIG. 1 according to present embodiments.

For example, FIG. 3 shows an RNFA 300 that is formed by inverting the NFA 100 of FIG. 1. The match state S7 of NFA 100 is set as an initial state RS0 of RNFA 300, the initial state S0 of NFA 100 is set as the match state RS7 of RNFA 300, and the goto transitions of the NFA 100 are reversed. Thus, for the RNFA 300 of FIG. 3, state RS1 is reached from state RS0 upon an "f" goto transition, state RS2 is reached from state RS1 upon an "e" goto transition, and state RS3 is reached from state RS2 upon a "d" goto transition. State RS4 is reached from either of states RS5 or RS3 upon an "[a-d]" goto transition. That is, assuming either the state RS5 or state RS3 is reached, any subsequent input character belonging to the character class [a-d] (i.e., 'a,' 'b,' 'c,' or 'd') will trigger a state transition to RS4. Furthermore, state RS5 is reached from state RS4 upon an "[a-f]" goto transition, state RS6 is reached from state RS5 upon a "b" goto transition, and match state RS7 is reached from state RS6 upon an "a" goto transition. Thus, RNFA 300 embodies the inverse regular expression IR1="fed([a-d][a-f])+ba" that is the reverse of the regular expression R1.

For other embodiments in which the NFA has multiple match or accept states, each of those match states becomes a corresponding initial state in the associated reverse NFA, and each of these initial states is activated at the beginning of the reverse search operation. Thereafter, each of these initial states becomes active again during the reverse search operation only if a transition thereto becomes active.

An input string is then searched for a match using the NFA 100, at 230. A match is detected if the input string contains a sequence of characters that matches the regular expression. For a match to occur, the active state(s) of the NFA 100 must successfully transition from the initial state S0 to the match or accept state S7. As discussed above with respect to Table 1, when a match is detected in the input string, there may be multiple nested substrings that also match the given regular expression.

Then at 240, a selected portion of the input string is stored as a match string in response to reaching the NFA accept state. For some embodiments, the entire input string is stored in response to reaching the accept state in the NFA. Alternatively, for other embodiments, a selected portion of the input string (e.g., corresponding to the number of input characters stored in an associated input buffer) is stored as the match string. In yet another embodiment, the entire input string may be stored at 240 regardless of whether or not a match is detected.

The order of the characters in the stored match string is then reversed at 250 to form a reverse match string. For example, the match string MS1="abbababccdef" would thus become the reverse match string RMS1="fedccbababba". According to one embodiment, the reverse match string may be generated by reading out the stored match string in reverse order. For example, a last-in-first-out (LIFO) memory buffer may be used to receive the match string MS1 from the NFA 100 and subsequently output the reverse match string RMS1 to the RNFA 300 by outputting the individual characters of the match string MS1 in reverse order. Alternatively, the order of characters in the match string may be reversed during the step of storing the match string (i.e., step 240) by loading the match string into a memory buffer in reverse order, in which case step 250 can be omitted.

At step 260, the reverse match string is then compared with the inverse regex embodied by the RNFA 300. The reverse search operation using the RNFA 300 may be substantially similar to the search operation using the NFA 100 as described above in step 230, with the exception that both the characters of the input string and the states of the NFA 100 are reversed. For example, Table 2 depicts a search operation between the reverse match string RMS1 and the inverse regex IR1 according to the RNFA 300 of FIG. 3.

TABLE 2

| Cycle | Input Character | Active States | Action | Length |
|---|---|---|---|---|
| 1 | f | 1 | | |
| 2 | e | 2 | | |
| 3 | d | 3 | | |
| 4 | c | 4 | | |
| 5 | c | 5 | | |
| 6 | b | 4, 6 | | |
| 7 | a | 5, 7 | match | 7 |
| 8 | b | 4, 6 | | |
| 9 | a | 5, 7 | match | 9 |
| 10 | b | 4, 6 | | |
| 11 | b | 5 | | |
| 12 | a | 4 | | |

As shown in Table 2, the first five input characters "fedcc" of the reverse match string RMS1 cause the state machine transitions from the initial state RS0 to state RS5 along goto transitions "f," "e," "d," "[a-d]," and "[a-f]," respectively. The sixth input character 'b' of RMS1 matches both of the goto transitions "b" and "[a-d]," thus causing the state machine to transition from state RS5 to states RS4 and RS6. Thus, in the sixth cycle, states RS4 and RS6 are simultaneously active in the RNFA 300. The seventh input character 'a' of RMS1 causes the active states RS4 and RS6 to transition to states RS6 and RS7, respectively, thus resulting in a first match detection at the reverse match state RS7. Accordingly, a first matching substringSS1="fedccba" of the reverse match string RMS1 is determined on the seventh cycle of the reverse search operation at RS7.

For some embodiments, the reverse search operation continues to compare the reverse match string using the RNFA 300 until all of the characters of the reverse match string are processed. Thus, for the above example, even though a match state S7 is detected on the seventh cycle (i.e., corresponding to the first occurrence of the character "a" in the reverse match string), the reverse search operation continues because there are additional characters in the reverse match string yet to be processed in the RNFA 300. Thereafter, the eighth input character 'b' of RMS1 causes the active state RS5 to once again transition to states RS4 and RS6. And the ninth input character 'a' subsequently causes the active states RS4 and RS6 to transition to states RS5 and RS7, respectively, thus resulting in a second match detection at RS7. Accordingly, a second matching substringSS2="fedccbaba" of the reverse match string RMS1 is determined on the ninth cycle of the reverse search operation at RS7. It should be noted that the first seven characters of the second matching substringSS2 have been processed in determining the first matching substringSS1 (i.e., the first substringSS1 is a subset of the second substringSS2). Thus, only two additional state transitions are necessary to arrive at the second matching substringSS2 (i.e., from state RS5 to RS6, and then from state RS6 to RS7). This process is continued until all of the characters of the reverse match string are processed by the RNFA.

During the reverse search operation, each time the match state of the RNFA is reached (e.g., which corresponds to the initial state of the NFA), the current cycle value of the reversed search operation is latched as the character length of the corresponding matching substring of the input string, at 270. For some embodiments, a counter is used to count the number of cycles, for example, by incrementing the count value output by the counter in response to the processing of each character in the inverse regular expression embodied by the RNFA. For example, the count value may be incremented each time a character of the reverse match string RMS1 is compared with a corresponding character of the inverse regular expression IR1. The counter may continue to increment the count value even after one or more match states have been detected (e.g., until the last character of the reverse match string is processed) in the RNFA. Thus, at the time any match state is detected, the current count value indicates the character length of a corresponding substring within the reverse match string.

For other embodiments, the counter can be incremented in response to state transitions along the path between the initial state RS0 and the match state RS7 of the RNFA 300.

Note that the ordering of steps shown in FIG. 2 is illustrative of an exemplary embodiment. For other embodiments, the steps may be performed in other orders, and multiple steps may be performed at the same time. For example, in another embodiment, the RNFA can be created prior to the search operation. For yet another embodiment, the RNFA can be created after the reverse match string is created.

Referring back to Table 2 above, when a match is first detected in RMS1, the reverse search operation has already processed seven characters ("fedccba") of the reverse match string RMS1, which corresponds to the seven state transitions S7-S6-S5-S4-S3-S2-S1-S0. Thus, at the time the first match is detected, the count value is CNT=7, indicating that the first matching substringSS1="fedccba" is seven characters in length. When the second match is detected in RMS1, the reverse search operation has processed a total of nine characters ("fedccbaba") of the reverse match string RMS1 (and nine state transitions have occurred on the way to the match state: S7-S6-S5-S4-S3-S2-S3-S2-S1-S0). Since the counter continues to increment after the first match detection, the count value is CNT=9 when the second match is detected. This indicates that the second matching substringSS2="fedccbaba" is nine characters in length.

For another embodiment, the reverse search operation can be terminated when the first match state is reached. For yet another embodiment, the reverse search operation can be terminated when the $N^{th}$ match state is reached, where N can be a predetermined integer selected by a user or network administrator. For still another embodiment, the reverse search operation can be terminated when there are no active states in the RNFA.

The above embodiments describe a fast and efficient method of determining the character lengths of one or more substrings within an input string that match a particular regular expression. For example, nested substrings within a match string are easily identified after reversing the match string and searching it for an inverse regular expression using a reverse non-finite automaton generated in accordance with the present embodiments. Furthermore, when multiple matching substrings exist within a given match string, at least one of the substrings is a subset of another substring. Thus, rather than searching for multiple substrings independently of one another or using a plurality of different counters to count the number of characters of the corresponding plurality of substrings, the character length of each of the plurality of substrings can be generated in the same reverse search operation using a single counter. More specifically, a single counter can be continuously incremented to generate count values indicative of character lengths for corresponding matching substrings.

Figure 4:
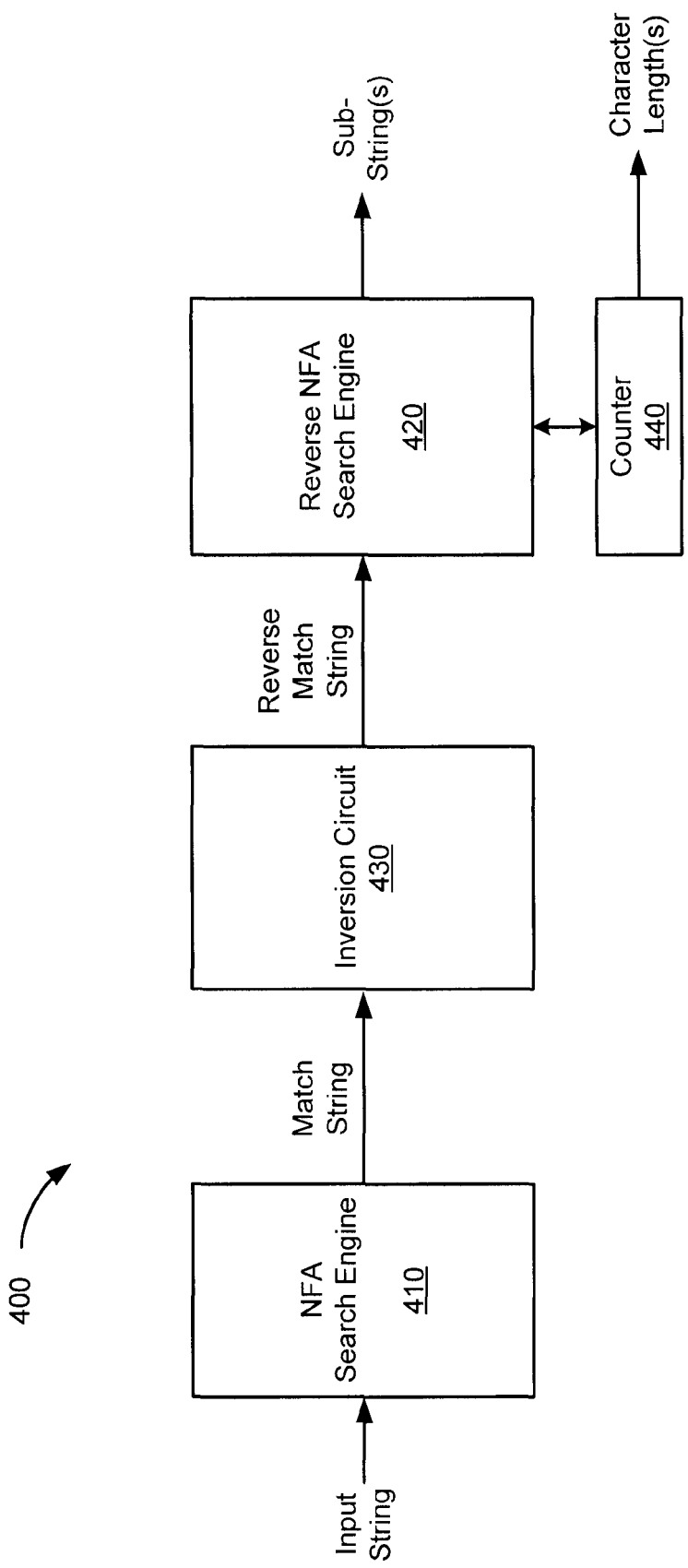
FIG. 4 illustrates a string searching system for determining character lengths of one or more substrings within an input string that match a regular expression according to some embodiments.

FIG. 4 illustrates a string searching system for determining character lengths of one or more substrings within an input string that match a regular expression, according to some embodiments. The string search system 400 includes an NFA search engine 410, a reverse NFA search engine 420, and inversion circuit 430, and a counter circuit 440. NFA search engine 410 may search an input string for one or more regular expressions. For purposes of discussion herein, however, the NFA 410 searches an input string for only a single regular expression (e.g., as shown in FIG. 1). The NFA search engine 410 may include one or more processors and/or logic elements used to implement a non-finite automaton corresponding to the given regex, and to carry out the string search operation.

The RNFA search engine 420 performs a search for the inverse of the regular expression embodied by the search tree implemented by the NFA search engine 410. Thus, the RNFA search engine 420 performs a string search operation that is backwards or reverse relative to the search operation performed by the NFA search engine 410. During the reverse search operation, the RNFA search engine 420 identifies each of the substrings that matches the regular expression and determines the character lengths of each of those matching substrings. The RNFA search engine 420 may similarly include one or more processors and/or logic elements to implement a search tree non-finite automaton corresponding to the inverse regular expression for performing the reverse string search.

In operation, the NFA search engine 410 receives an input string and searches it for the corresponding regular expression. The NFA search engine 410 may carry out a string search operation similar to the one described above with respect to FIGS. 1 and 2. Upon reaching the match or accept state, the NFA search engine 410 forwards the input string or a selected portion thereof to the inversion circuit 430 as a match string. For some embodiments, the match string forwarded to the inversion circuit 430 begins with the input character that resulted in the NFA reaching the accept state. For example, the NFA search engine 410 may forward the match string MS1="abbababccdef" to the inversion circuit 430 because processing the input character "f" resulted in the NFA reaching the accept state S7.

The inversion circuit 430 receives the match string from the NFA search engine 410 and reverses the order of characters therein to generate a reverse match string. The inversion circuit 430 can be any suitable circuit that reverses the order of characters in the match string to generate the reverse match string. For some embodiments, inversion circuit 430 includes a memory to store the match string and/or the reverse match string. For one embodiment, inversion circuit 430 is implemented using a LIFO buffer.

The counter circuit 440 is coupled to the RNFA search engine 420 and maintains a current count value indicative of the number of compare cycles or iterations performed by the RNFA engine 420 during its search operations.

The RNFA search engine 420 receives the reverse match string, and then searches the reverse match string for the corresponding inverse regular expression embodied therein, for example, in the manner described above with respect to FIGS. 2 and 3. The first character of the reverse match string corresponds with the character in the input string that resulted in reaching the match or accept state in the NFA. With each cycle (e.g., iteration) of the reverse search operation, the RNFA search engine 420 updates a count value stored therein. For some embodiments, the count value may be incremented each time a subsequent character of the reverse match string is processed. For other embodiments, the count value may be incremented in response to state transitions of the reverse non-finite automaton (i.e., for each successful comparison between a character in the reverse match string and the character of a corresponding goto transition of the reverse NFA). In this manner, the count value indicates the character lengths of one or more substrings that are detected within the match string.

When a match state is detected in the reverse search operation, the RNFA search engine 420 associates the current count value with a corresponding one of the identified substrings. The RNFA search engine 420 continues to process any remaining characters in the reverse match string while continuing to increment the count value. For some embodiments, the count value is reset only after all characters of the reverse match string are processed. For other embodiments, the count value can be reset when there are no active states in the RNFA. Thus, each time the match state is reached, the RNFA search engine 420 outputs the matching substring along with the current count value indicating the character length of the corresponding substring.

According to some embodiments, the NFA search engine 410 and the RNFA search engine 420 may be implemented using conventional string search devices and/or algorithms. Such embodiments are advantageous because they can leverage existing string search technology. For one embodiment, NFA search engine 410 and the RNFA search engine 420 can be of the type disclosed in commonly owned U.S. Pat. No. 7,440,304, which is incorporated by reference herein.

For other embodiments, the NFA search engine 410 and/or the RNFA search engine 420 can be of the type disclosed in co-pending and commonly owned U.S. patent application Ser. No. 12/131,992 entitled "CONTENT ADDRESSABLE MEMORY DEVICE HAVING PROGRAMMABLE INTERCONNECT STRUCTURE," now issued as U.S. Pat. No. 7,643,353, which is incorporated by reference herein. The CAM device disclosed in U.S. patent application Ser. No. 12/131,992 includes a CAM array, a programmable interconnect structure, and a priority encoder. The CAM array includes a plurality of CAM rows, each row including a number of CAM cells coupled to a match line. The programmable interconnect structure is coupled to each CAM row and is configured to selectively route the match results from any CAM row as an input match signal to any number of arbitrarily selected CAM rows at the same time. As a result, the CAM device of U.S. patent application Ser. No. 12/131,992 can store and implement search operations for more complex regular expressions that include strings separated by various logical operators such as AND (.), OR (|), the Kleene star (*), quantified character classes, as well as complex regular expressions that include overlapping and/or nested patterns such as R1. Thus, when CAM devices of the type disclosed in U.S. patent application Ser. No. 12/131,992 are employed as the NFA search engine 410 and/or the RNFA search engine 420, search system 200 can implement search operations for regular expressions using minimal CAM storage area.

A more detailed operation of search system 400 is described below. When the NFA search engine 410 receives an input string, it processes each character of the input string in order by comparing the input character with a corresponding character of the regular expression implemented therein. Until a first character match is detected, NFA search engine 410 continues to compare each subsequent character of the input string with the first character of the regular expression. When NFA search engine 410 detects a match between a character of the input string and the regular expression, it proceeds by comparing the next character of the input string with the second character of the regular expression. Thereafter, NFA search engine 410 continues comparing subsequent characters of the input string with subsequent characters of the regular expression until a match state is reached. This process may continue until every character of the input string has been processed.

When a match state is reached, NFA search engine 410 outputs a selected portion of the input string as the match string. The match string includes at least the one or more sequences of input characters that resulted in the match condition. For example, the match string may include the entire sequence of input characters, beginning with the first character of the input string, and ending with the character that results in the match or accept state. For other embodiments, the match string can include a sequence of input characters stored in an input buffer connected to the NFA search engine 410.

The inversion circuit 430 receives the match string from the NFA search engine 410 either serially or in parallel, and in response thereto inverts the match string to form the reverse match string. For some embodiments, inversion circuit 430 can be a LIFO.

The reverse match string is provided as an input to RNFA search engine 420, which in response thereto sequentially compares each character of the reverse match string with corresponding characters of the inverse regular expression implemented therein. For example, the RNFA search engine 420 can construct the RNFA corresponding to the inverse regular expression IR1 by logically ordering a sequence of compare operations. The RNFA search engine 420 compares respective input characters of the reverse match string RMS1 with the characters of the inverse regular expression IR1 in the order specified (e.g., "f," "e," "d," "[a-d]," etc.). If there is a mismatch condition, the RNFA search engine 420 resets the state of the RNFA by returning to the initial state of the RNFA and comparing the next character of the reverse match string IR1 with first character of the inverse regular expression.

The counter circuit 440 stores a count value CNT and increments CNT each time the RNFA search engine 420 processes a character in the reverse match string. When the match state of the reverse NFA is reached, the RNFA search engine 420 outputs the sequence of characters that triggered the RNFA match state as a matching substring of the input string. The RNFA search engine 420 causes counter circuit 440 to output the current count value CNT, which indicates the character length of the corresponding substring output.

Thereafter, the RNFA search engine 420 continues processing the remaining characters of the reverse match string to detect any additional substring matches. This procedure continues until every character of the reverse match string is processed by RNFA search engine 420. When RNFA search engine 420 completes searching the reverse match string, the counter circuit 440 resets CNT to zero.

By searching the reverse match string for the inverse regular expression while continuously updating the count value CNT, the RNFA search engine 420 can detect each matching substring of the input string and its character length at the same time using a single counter circuit 440.

Although the inversion circuit 430 and counter circuit 440 are shown as separate circuit elements in the exemplary embodiment of FIG. 4, for actual embodiments, they may be part of the reverse NFA search engine 420. Further, although the NFA search engine 410 and the RNFA search engine 420 are described above for exemplary embodiments as two separate search engines, for actual embodiments, the NFA search engine 410 and the RNFA search engine 420 can be implemented using the same search engine.

Figure 5:
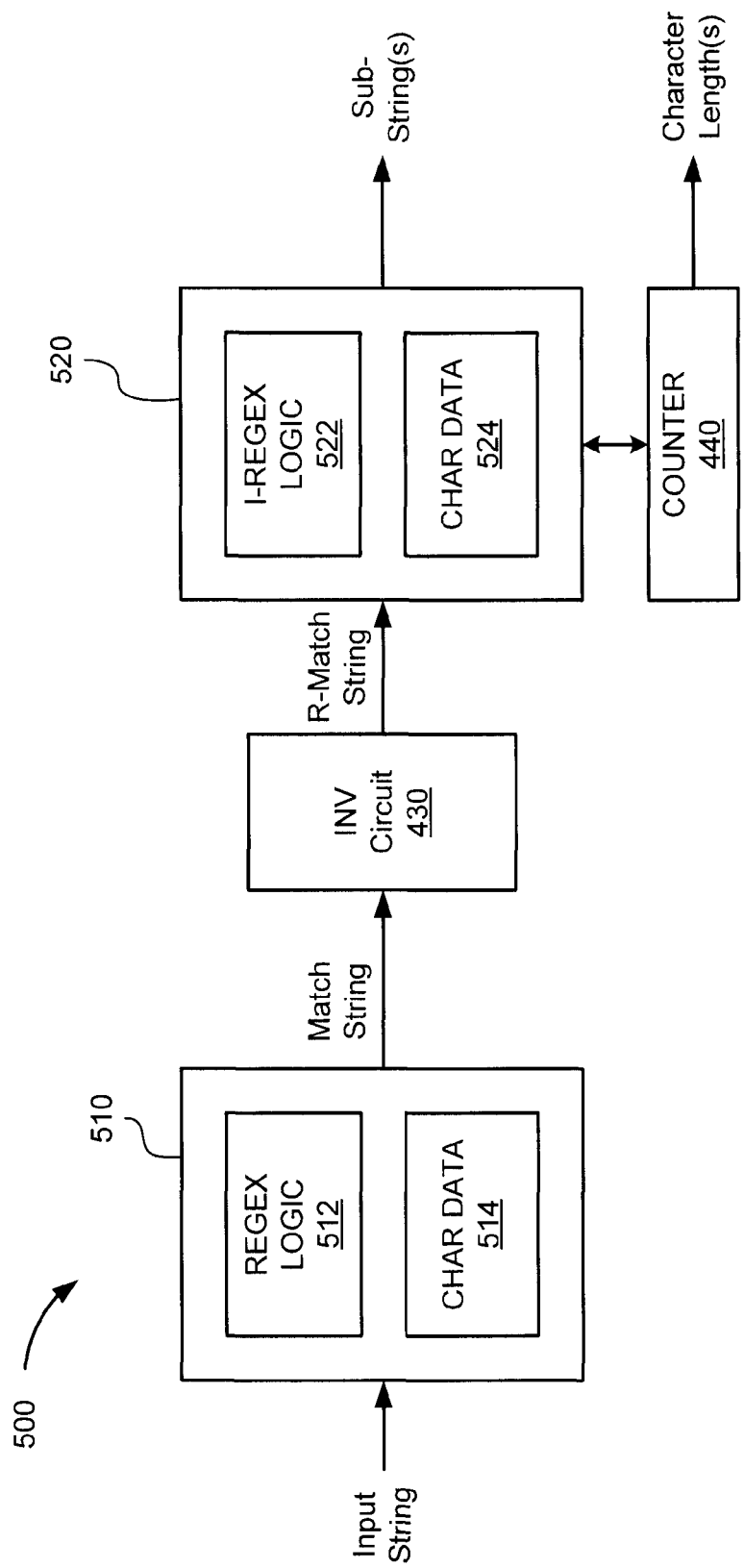
FIG. 5 illustrates a more detailed embodiment of the string searching system shown in FIG. 4.

FIG. 5 illustrates a more detailed embodiment of the string searching system shown in FIG. 4. The string search system 500 includes an NFA search engine 510 and a reverse NFA search engine 520. NFA search engine 510 is one embodiment of NFA search engine 410 of FIG. 4, and reverse NFA search engine 520 is one embodiment of reverse NFA search engine 420 of FIG. 4. The NFA search engine 510 includes a character database 514 connected to regex logic 512. The character database 514 stores the actual character values of the corresponding regular expression (i.e., the state transitions of the NFA). The regex logic 512 is connected to the character database 514, and includes circuitry and/or software for performing one or more logical operations on the characters stored in the character database 514. For example, the regex logic 512 may organize the characters stored in the character database 514 to form the corresponding NFA for the given regex. The regex logic 512 may construct the NFA by logically "stringing" the characters together in the appropriate order. When the regex logic 512 receives an input string, it processes each character of the input string, in order, by comparing the input character with a corresponding character of the regular expression, as stored in the character database 514.

When the regex logic 512 detects a match with the final character in the regex (signaling that the match state of the NFA has been reached), the NFA search engine 510 outputs a match string. The match string, at this point, includes at least the one or more sequences of input characters that lead to the match detection. For example, the match string may include the entire sequence of characters, beginning with the first character of the input string, and ending with the character that results in the match detection. Alternatively, the match string may include only those input character sequences that match the given regular expression. In other embodiments, the NFA search engine 510 may simply output the entire input string as the match string.

The RNFA search engine 530 includes inverse regex logic 522 and a character database 524. The inverse regex logic 522 and the character database 524 may function in a similar manner as described above in reference to the regex logic 512 and the character database 514, respectively, of the NFA search engine 510. However, the inverse regex logic 522 implements the inverse of the regular expression searched for by the NFA search engine 510. The character database 524 stores the actual character values of the corresponding inverse regular expression.

The inverse regex logic 522 is connected to the character database 524, and includes circuitry and/or software for performing one or more logical operations on the characters stored in the character database 524. According to an embodiment, the inverse regex logic 522 may logically combine the individual characters stored in the character database 524 to form the character classes of the inverse regex. For example, each of the character classes [a-f] and [a-d] may be implemented by the inverse regex logic 522 as a logical combination or function of the individual characters 'a,' 'b,' 'c,' 'd,' 'e,' 'f,'. This would preclude the need to store duplicate copies for any repeated characters in the inverse regular expression, thus preserving storage space in the character database 524.

The inverse regex logic 522 may include additional software and/or circuitry to organize the characters stored in the character database 524 to form an RNFA corresponding to the inverse regular expression. In this manner, when the inverse regex logic 522 receives the reverse match string from the memory buffer 528, it may process each character of the reverse match string in the order received by comparing them with corresponding characters of the inverse regular expression, as stored in the character database 524.

For example, the inverse regex logic 522 may construct the RNFA corresponding to the inverse regex IR1 by logically ordering a sequence of compare operations. The inverse regex logic 522 will compare respective input characters of the reverse match string RMS1 with the elements of the inverse regex IR1 in the order specified (e.g., "f," "e," "d," "[a-d]," etc.) as long as matches are continuously detected between the characters of the reverse match string RMS1 and the inverse regular expression IR1. If there is a break in the sequence of character matches (e.g., the next character of the reverse match string RMS1 does not match the next element of the inverse regular expression IR1) and there are no active states in the RNFA, the inverse regex logic 522 resets the state of the RNFA by comparing the following character of the reverse match string with first character of the inverse regular expression.

For other embodiments, the NFA search engine 510 and the RNFA search engine 520 can share the same character database.

Figure 6:
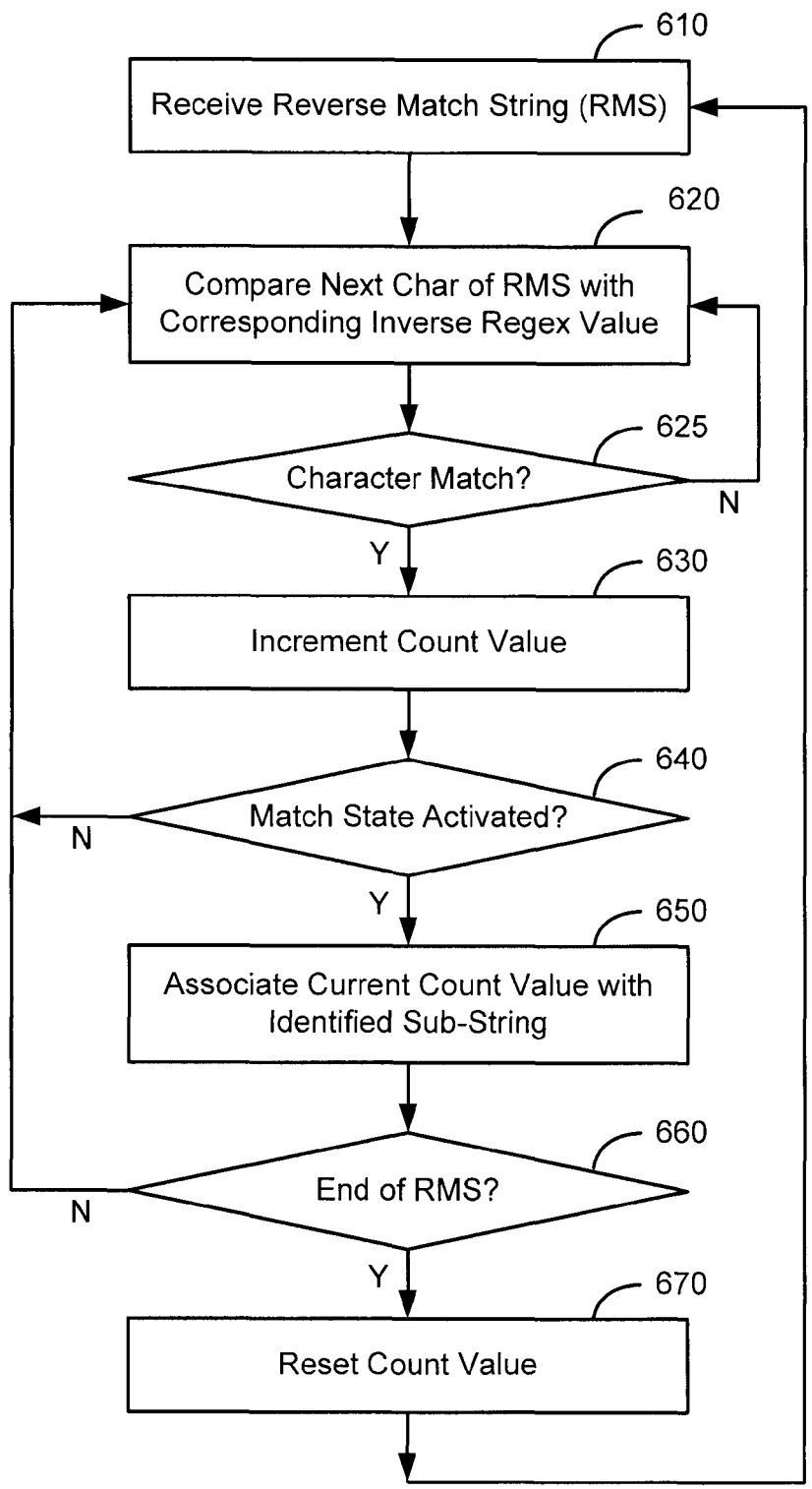
FIG. 6 illustrates a substring search operation according to some embodiments.

FIG. 6 illustrates an exemplary substring search operation performed by the reverse NFA search engine 420. The RNFA search engine 420 initiates the substring search operation, at 610, upon receiving a reverse match string. As described above, the reverse match string may be a portion of a corresponding input string, with the characters in reverse order. For example, as discussed above with respect to FIG. 2, a search of the input string IN1="abbababccdefg" for the regex R1="ab([a-f][a-d]+def" may result in the reverse match string RMS1="fedccbababba." Thus, the reverse match string may correspond only to the "matching portion" of the input string (e.g., the reverse of the match string MS1="abbababccdef"). Alternatively, the reverse match string may correspond to the entire input string in reverse order (e.g., RMS1'="gfedccbababba").

At 620, the RNFA search engine compares the next character of the reverse match string with a corresponding inverse regular expression value. If the reverse match string was just received, then the first character of the reverse match string is compared with the first element of the inverse regex at this step. For example, upon receiving the reverse match string RMS1, the RNFA search engine compares the first character T of the reverse match string RMS1 with the first element of the inverse regular expression IR1="fed([a-d][a-f])+ba". In certain embodiments, where the reverse match string corresponds to only the matching portion of the input string, the first character of the reverse matching string matches the first character of the inverse regular expression.

The RNFA search engine then instructs the counter circuit 440 to increment a count value stored therein, at 630, to indicate that an additional character of the reverse match string has just been processed. The count value CNT is used to keep track of the character lengths of substrings within the reverse match string. Thus, the count value CNT may be updated each time a subsequent character in the reverse match string is processed. In alternative embodiments, the count value CNT may be maintained and updated by the RNFA search engine 420.

Then at 640, the RNFA search engine 420 determines whether or not a match state has been activated. This determination is typically associated with a comparison between the final element of the inverse regular expression and a character of the reverse match string. For example, the first character T of the reverse match string RMS1 matches the first element "f" of the inverse regular expression IR1, but a match state has not yet been reached. Upon determining that the match state has not yet been activated, the RNFA search engine returns to step 620, and compares the next character of the reverse match string (e.g., 'e' of RMS1) with the next character of the inverse regex (e.g., "e" of IR1). Steps 620 to 640 may be repeated any number of times, as long as a match state has not yet been detected at 640. The reverse search operation can be terminated if there are no active states in the RNFA.

If it is determined, at 640, that the match state has been activated, then the RNFA search engine proceeds, at 650, by associating the current count value, stored in the counter, with the identified substring. For example, on the seventh cycle of the substring search operation, a match state may be detected after comparing the character 'a' of the reverse match string RMS1 with the corresponding element "a" of the inverse regex IR1. Thus, at 650, the RNFA search engine may output the matching substring SS1="fedccba" concurrently while the counter circuit 440 outputs the current count value CNT=7.

At 660, RNFA search engine determines whether the end of the reverse match string has been reached. In other words, the RNFA search engine may determine whether the final character of the reverse match string has been processed, or if there are any additional characters in the reverse match string yet to be compared. For example, after the seventh cycle of the search operation, there are still five remaining characters in the reverse match string RMS1 yet to be processed. Upon determining that the end of the reverse match string has not been reached, the RNFA search engine returns to step 620, and compares the next character of the reverse match string (e.g., 'e' of RMS1) with the next element of the inverse regular expression (e.g., "e" of IR1). Steps 520 to 660 may further be repeated any number of times, as long as the RNFA search engine has not reached the end of the reverse match string.

If it is determined, at 660, that the end of the reverse match string has been reached, then the RNFA search engine subsequently triggers the counter to reset the corresponding count value, at 670. In this manner, when the RNFA search engine receives a new reverse match string, at 610, the count value is once again ready to be incremented in step with the processing of each character in the reverse match string.

Figure 7:
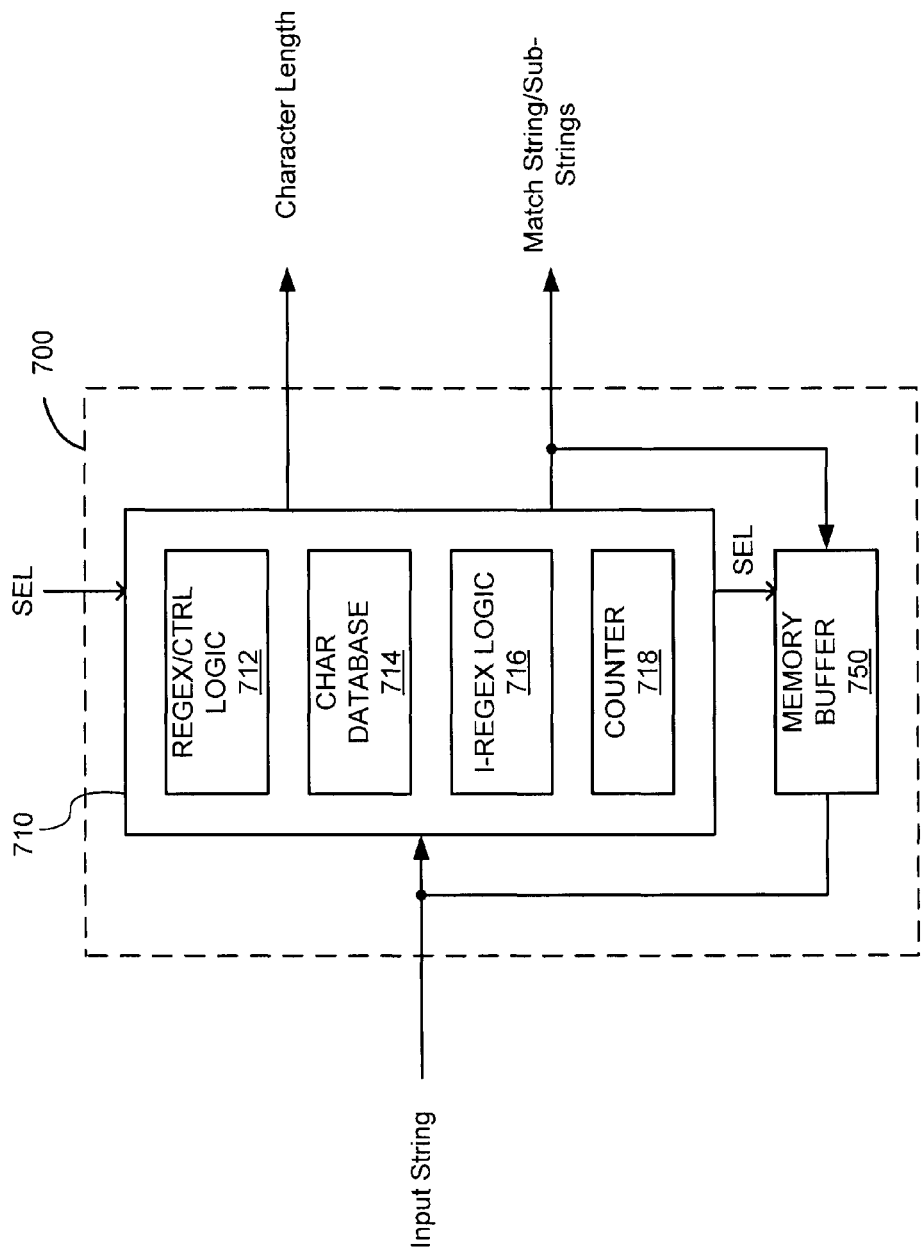
FIG. 7 illustrates a system for determining character lengths of one or more substrings within an input string that match a regular expression according to other embodiments.

FIG. 7 illustrates a search system 700 in accordance with other embodiments. The search system 700 includes a dual-mode NFA/RNFA search engine 710 connected to a memory buffer 750. The search system 700 may be functionally similar to the string searching systems 400 and 500 described above with respect to FIGS. 4 and 5, respectively. For example, the search system 700 may be configured to receive an input string, search the input string for one or more substrings that match a given regular expression, and output the matching substrings along with their corresponding character lengths (e.g., as described above in reference to FIG. 6).

The NFA/RNFA search engine 710 includes circuitry and/or software to construct both the NFA representing the regular expression and the RNFA representing the inverse regular expression. The NFA/RNFA search engine 710 may be selectively operated in one of two (or more) modes. According to an embodiment, the NFA/RNFA search engine 710 receives a select input (SEL) that is used to configure the NFA/RNFA search engine 710 to operate in either a forward search mode (e.g., using the NFA) or a reverse search mode (e.g., using the RNFA). The NFA/RNFA search engine 710 further includes regex/control logic 712, a character database 714, inverse regex logic 716, and a counter 718.

The character database 714 stores the character values found in the regular expression and the inverse regular expression (i.e., the corresponding state transitions of both the NFA and RFNA, respectively). As shown with respect to FIGS. 1 and 3, the same characters are used to implement both the NFA and the RNFA. Thus, it may be advantageous to consolidate these characters into a single character database 714, which may be shared by both the regex/control logic 712 and the inverse regex logic 716, thereby conserving circuit area. For example, the character database may store the characters 'a,' 'b,' 'c,' 'd,' 'e,' 'f,' and 'g,' which are commonly shared by both the regular expression R1="ab([a-f][a-d])+def" and the inverse regex IR1="fed([a-d][a-f])+ba". According to an embodiment, the character database 714 may correspond to a CAM array.

The regex/control logic 712 includes circuitry and/or software for performing one or more logical operations on the characters stored in the character database 714. The regex/control logic 712 may function in a similar manner as described with respect to the regex logic 512. For example, the regex/control logic 712 may logically order (or provide logical access to) the characters stored in the character database 714 to form the corresponding NFA for the given regular expression. Additionally, the regex/control logic 712 may generate a logical combination of any number of characters in the character database 714 to form one or more character classes represented in the regular expression. The regex/control logic 712 may further include control circuitry for controlling the operations of the NFA/RNFA search engine 710 (e.g., for controlling a switching between the different modes of operation).

The inverse regex logic 716 shares the character database 714 with the regex/control logic 712, and includes circuitry and/or software for performing one or more logical operations on the characters stored in the character database 714. The regex logic 716 may function in a similar manner as described with respect to the regex logic 522. For example, the inverse regex logic 716 may logically combine the characters stored in the character database 714 to form the corresponding RNFA for the inverse regular expression and, additionally, to generate one or more character classes of the inverse regular expression.

The inverse regex logic 716 may control an operation of the counter 718, for example, in the manner described above with respect to FIG. 6. Specifically, the inverse regex logic 716 may instruct the counter 718 to increment a stored count value (e.g., for each character the inverse regex logic 716 processes). The inverse regex logic 716 may also instruct the counter 718 to reset the count value (e.g., whenever the inverse regex logic 716 fails to detect a character match between an input character and a corresponding character of the inverse regular expression or when the inverse regex logic 716 has completed a substring search operation). Accordingly, the count value stored by the counter 718 is configured to track a character length of one or more substrings identified by the inverse regex logic 716.

The memory buffer 750 is connected to receive the match string output from the NFA/RNFA search engine 710, and to provide a reverse match string back to the NFA/RNFA search engine 710. The memory buffer 750 may be functionally similar to the memory buffer 528 described above. According to an embodiment, the memory buffer 710 may be operated based on the state of the select signal. For example, when the select signal places the NFA/RNFA search engine 710 in the string search mode, the memory buffer 710 may be configured to store the match string output by the NFA/RNFA search engine 710. Then, when the NFA/RNFA search engine 710 is placed in the substring search mode, the memory buffer 710 may be configured to output the stored match string, in reverse order, back to the NFA/RNFA search engine 710.

In operation, the NFA/RNFA search engine 710 is first placed in the string search mode. For example, the select signal may be de-asserted (or alternatively, asserted) to activate (or "turn on") the regex/control logic 712. While in the string search mode, the inverse regex logic 716 may be placed in an inactive (or "off") state. The NFA/RNFA search engine 710 receives an input string, and the regex/control logic 712 searches the input string, using the character database 714, for (character matches with) the given regular expression. When the regex/control logic 712 determines that a match state has been reached, the NFA/RNFA search engine 710 outputs the corresponding match string. A copy of the output match string is subsequently stored by the memory buffer 750.

The NFA/RNFA search engine 710 is then placed in the substring search mode. For example, the select signal may be asserted (or alternatively, de-asserted) to turn on the inverse regex logic 716. Asserting the select signal may additionally turn off the regex/control logic 712. The memory buffer 750 then outputs the stored match string back to the NFA/RNFA search engine 710, in reverse order (e.g., as the reverse match string). The inverse regex logic 716 searches the reverse match string, again using the character database 714, for one or more substrings that match the inverse regular expression. The inverse regex logic 716 may perform a substring search operation, for example, in the manner described above with respect to FIGS. 5 and 6.

While the inverse regex logic 716 processes each character of the reverse match string, the counter 718 continuously updates a running count of the character lengths for any identified matching substrings. Thus, when the inverse regex logic 716 determines that a match state has been reached, the NFA/RNFA search engine 710 may output the matching substring, concurrently, with its associated character length. According to an embodiment, the order of characters in the matching substrings may be reversed (e.g., using the memory buffer 750) prior to being output by the NFA/RNFA search engine 710. For as long as there are characters in the reverse match string left unsearched, the inverse regex logic 716 may continue processing each subsequent input character, while the counter 718 continues to increment the count value. If there are no active states remaining, the reverse search operation terminates.

The string searching system 700 described above provides several advantages. For example, by performing substring searches using a reverse match string (e.g., in the manner described above with respect to FIGS. 2-6), the string searching system 700 is able to detect multiple matching substrings (within the input string) using a single counter 750. System resources are also conserved by consolidating the character values used to implement both the NFA and RNFA into a single character database 714 that is shared by both the regex/control logic 712 and the inverse regex logic 716. According to another embodiment, the counter 718 may also be shared by the inverse regex logic 716 and the regex/control logic 712. For example, the counter 718 may additionally be used to keep track of a character length of the match string searched for and identified by the regex/control logic 712.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method of determining lengths of one or more substrings within an input string of characters that matches a regular expression embodied by a non-deterministic finite state automaton (NFA) stored in a search system including a forward search engine, a reverse search engine, and an inversion circuit, the method comprising:
   comparing the input string with the regular expression using the NFA in a forward search operation performed in the forward search engine;
   detecting a match state in the NFA in the forward search engine;
   selecting a portion of the input string as a match string in response to the match state;
   inverting the NFA to create a reverse NFA that embodies an inverted regular expression;
   reversing the match string using the inversion circuit to create a reverse match string;
   comparing the reverse match string with the inverted regular expression using the reverse NFA in a reverse search operation performed in the reverse search engine; and
   incrementing a count value in response to each character processed in the reverse search operation performed in the reverse search engine.

2. The method of claim 1, wherein the NFA comprises an initial state and a number of intermediate states between the initial state and the match state, and wherein the match state of the NFA corresponds to an initial state of the reverse NFA.

3. The method of claim 2, wherein the initial state of the NFA corresponds to a match state of the reverse NFA.

4. The method of claim 3, further comprising:
   storing the count value each time the match state of the reverse NFA is reached during the reverse search operation, wherein each stored count value indicates the character length of a corresponding matching substring.

5. A system for determining lengths of one or more substrings within an input string of characters that matches a regular expression embodied by a non-deterministic finite state automaton (NFA), comprising:
   means for comparing the input string with the regular expression using the NFA in a forward search operation;
   means for detecting a match state in the NFA;
   means for selecting a portion of the input string as a match string in response to the match state;
   means for inverting the NFA to create a reverse NFA that embodies an inverted regular expression;
   means for reversing the match string to create a reverse match string;

means for comparing the reverse match string with the inverted regular expression using the reverse NFA in a reverse search operation; and means for incrementing a count value in response to each character processed in the reverse search operation.

6. The system of claim 5, wherein the NFA comprises an initial state and a number of intermediate states between the initial state and the match state, and wherein the match state of the NFA corresponds to an initial state of the reverse NFA.

7. The system of claim 6, wherein the initial state of the NFA corresponds to a match state of the reverse NFA.

8. The system of claim 7, further comprising:

means for storing the count value each time the match state of the reverse NFA is reached during the reverse search operation, wherein each stored count value indicates the character length of a corresponding matching substring.

9. A system for determining lengths of one or more substrings within an input string of characters that matches a regular expression embodied by a non-deterministic finite state automaton (NFA), comprising:

a search engine configured to compare the input string with the regular expression to identify a match string that contains the one or more substrings that match the regular expression;

an inversion circuit coupled to the search engine and configured to invert the match string to create a reverse match string;

a reverse search engine configured to compare the reverse match string with an inverted regular expression that embodies a reverse NFA; and a counter circuit coupled to the reverse search engine and configured to increment a count value upon each compare cycle in the reverse search engine, wherein the counter circuit outputs the count value each time a match condition is detected in the reverse search engine.

10. The system of claim 9, wherein each count value output by the counter circuit indicates the number of characters in a corresponding one of the matching substrings.

11. The system of claim 9, wherein the NFA comprises an initial state and a number of intermediate states between the initial state and the match state, and wherein the match state of the NFA corresponds to an initial state of the reverse NFA.

12. The system of claim 11, wherein the initial state of the NFA corresponds to a match state of the reverse NFA.

13. The system of claim 9, wherein the search engine comprises a first content addressable memory (CAM) device, and the reverse search engine comprises a second CAM device.

\* \* \* \* \*